United States Patent
Comer et al.

(10) Patent No.: US 12,394,115 B2
(45) Date of Patent: Aug. 19, 2025

(54) AGGREGATED COLOR PALETTE GENERATION BASED ON USER CONTEXT AND MACHINE LEARNING

(71) Applicant: Dell Products L.P., Round Rock, TX (US)

(72) Inventors: Ryan Nicholas Comer, Round Rock, TX (US); Erik Summa, Austin, TX (US); Jason Scott Morrison, Chadron, NE (US)

(73) Assignee: Dell Products L.P., Round Rock, TX (US)

( * ) Notice: Subject to any disclaimer, the term of this patent is extended or adjusted under 35 U.S.C. 154(b) by 175 days.

(21) Appl. No.: 18/150,784

(22) Filed: Jan. 5, 2023

(65) Prior Publication Data
US 2024/0233207 A1    Jul. 11, 2024

(51) Int. Cl.
*G06T 11/00*    (2006.01)
*G06V 10/70*    (2022.01)
*G06V 10/774*   (2022.01)

(52) U.S. Cl.
CPC .......... *G06T 11/001* (2013.01); *G06V 10/768* (2022.01); *G06V 10/774* (2022.01)

(58) Field of Classification Search
CPC ... G06T 11/001; G06V 10/768; G06V 10/774
USPC ........................................................ 345/418
See application file for complete search history.

(56) References Cited

U.S. PATENT DOCUMENTS

| | | | |
|---|---|---|---|
| 9,763,021 B1 * | 9/2017 | Peeler ................ | H05B 47/105 |
| 12,067,209 B2 * | 8/2024 | Powderly .............. | G06F 3/0346 |
| 2018/0133900 A1 * | 5/2018 | Breazeal ............... | B25J 19/026 |
| 2019/0278323 A1 * | 9/2019 | Aurongzeb ........... | G06F 1/1652 |
| 2021/0135790 A1 * | 5/2021 | Files ..................... | H04L 1/0002 |
| 2021/0312672 A1 * | 10/2021 | Luo ....................... | G06T 11/00 |
| 2022/0101593 A1 * | 3/2022 | Rockel ................... | G06T 15/10 |
| 2024/0196023 A1 * | 6/2024 | Reddy .................... | G06T 7/194 |
| 2024/0226734 A1 * | 7/2024 | Benedetto .............. | A63F 13/77 |
| 2024/0404225 A1 * | 12/2024 | Ghosh ..................... | G06T 7/74 |
| 2025/0022100 A1 * | 1/2025 | Wu ......................... | G06T 5/70 |

OTHER PUBLICATIONS

Trivedi MM, Huang KS, Mikic I. Dynamic context capture and distributed video arrays for intelligent spaces. IEEE Transactions on Systems, Man, and Cybernetics—Part A: Systems and Humans. Dec. 20, 2004;35(1):145-63.*

Gao, Y., Liang, J. and Yang, J., 2024. Color Palette Generation From Digital Images: A Review. Color Research & Application.*

* cited by examiner

*Primary Examiner* — Phu K Nguyen (74) *Attorney, Agent, or Firm* — Norton Rose Fulbright US LLP (57) ABSTRACT

Systems and methods described herein may provide a system that utilizes a machine learning algorithm to determine a color palette based on user context and assigning colors of the color palette to connected systems or peripherals to apply lighting effects. A method may include retrieving, by an information handling system, user context; analyzing, by the information handling system, user context to determine a plurality of colors associated with the user context; generating, by the information handling system, a set of color palettes based, at least in part, on the user context; and generating, by the information handling system, an aggregate color palette based, at least in part, on the set of color palettes. Other aspects are also disclosed.

17 Claims, 10 Drawing Sheets

AGGREGATED COLOR PALETTE GENERATION BASED ON USER CONTEXT AND MACHINE LEARNING

FIELD OF THE DISCLOSURE

The instant disclosure relates to information handling systems. More specifically, portions of this disclosure relate to execution of applications in a multi-room user environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Information handling systems may be used to execute applications such as gaming applications. Aspects of embodiments of this disclosure use a machine learning algorithm to determine a color palette based on user context and assign colors of the color palette to connected systems or peripherals to apply lighting effects. The determined color palette may be used to provide lighting effects in a home gaming environment in which a user operates a controller to interact with a gaming application. The gaming controller or other device interacting with the gaming application may receive input, such as a video feed of the user and environment, and provide the input to a gaming hub. The gaming hub may determine the color palette and provide instructions to devices in the home gaming environment to display lighting effects using the color palette. Examples of devices interacting in a home gaming environment are described in this disclosure.

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

According to one embodiment, a method for execution by an information handling system, such as a hub device, includes retrieving, by an information handling system, user context; analyzing, by the information handling system, user context to determine a plurality of colors associated with the user context; generating, by the information handling system, a set of color palettes based, at least in part, on the user context; and generating, by the information handling system, an aggregate color palette based, at least in part, on the set of color palettes.

In some embodiments, the user context comprises a plurality of components comprising at least one of: gaming application executed by the information handling system; gaming application history; camera feed; audio input; at least one pre-existing color palette; or friends of the user with at least one pre-existing color palette. In another embodiment, generating at least one aggregate color palette based, at least in part, on the set of color palettes uses a machine learning algorithm with the user context as an input. The user may determine a weight for each of a plurality of components of the user context used to generate the aggregate color palette. In certain embodiments, the aggregate color palette comprises: a primary color; a secondary color; a tertiary color; and a quaternary color. In some embodiments, a color of the aggregate color palette is assigned to at least one of a plurality of peripherals connected to the information handling system based, at least in part, on peripheral usage characteristics. The information handling system may receive feedback from the user regarding the assignment of color to peripheral and update the user context based, at least in part, on the user feedback.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

The user's home may be divided into different environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on a one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application session for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
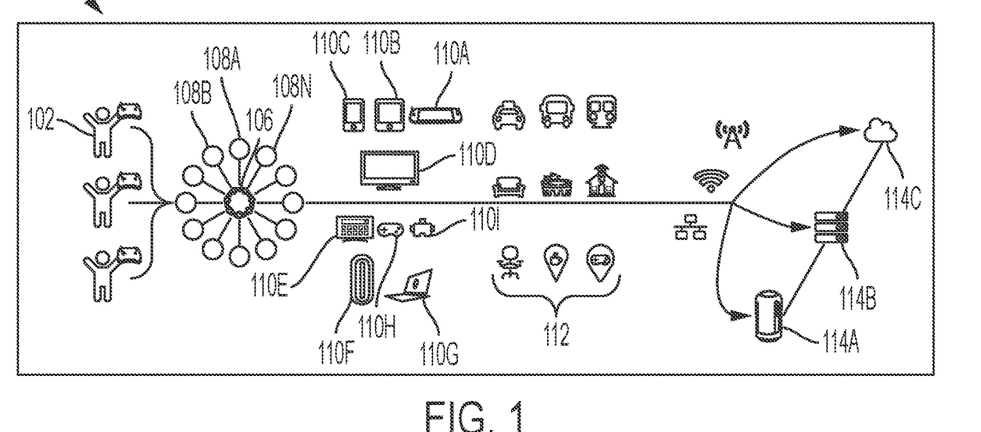
FIG. 1 is a block diagram illustrating aspects of a configurable system for providing services to users according to some embodiments of the disclosure.

FIG. 1 is a block diagram illustrating aspects of a configurable system for providing services to users according some embodiments of the disclosure. A system 100 includes users 102 who may have access to a shared library of applications 106 including applications 108A-108N. The users 102 may have separate libraries, with some overlapping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

Figure 2:
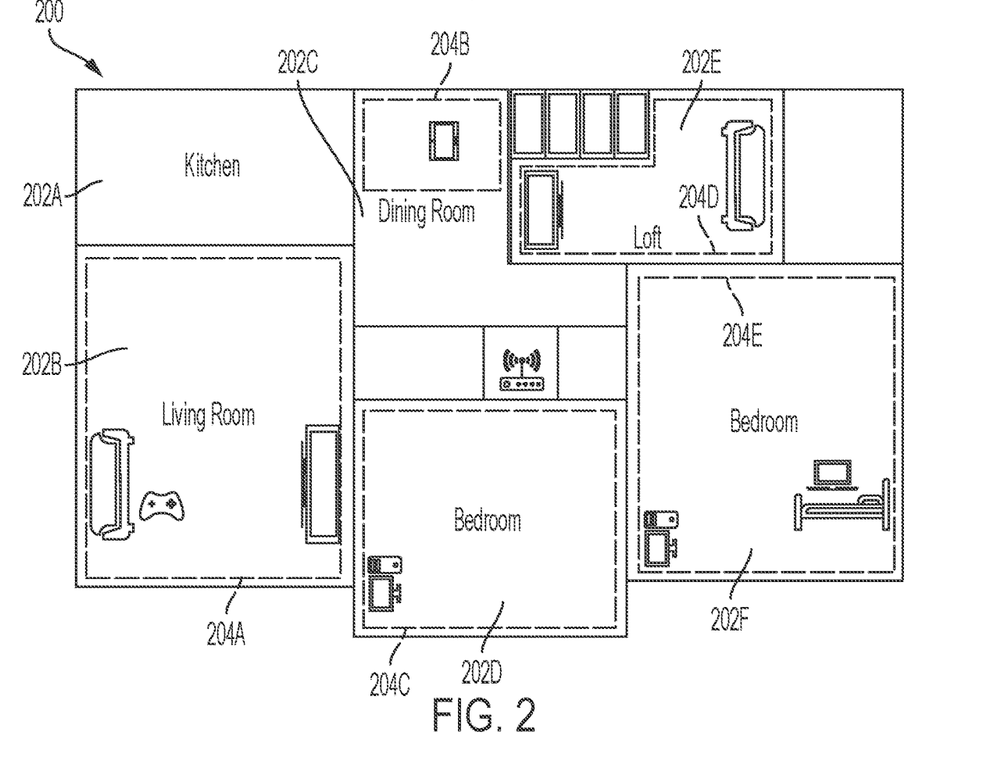
FIG. 2 is a block diagram illustrating possible game environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session. In some embodiments, multiple games may be hosted on a single device. In some embodiments, multiple games may target a single output device. In some embodiments, solution manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
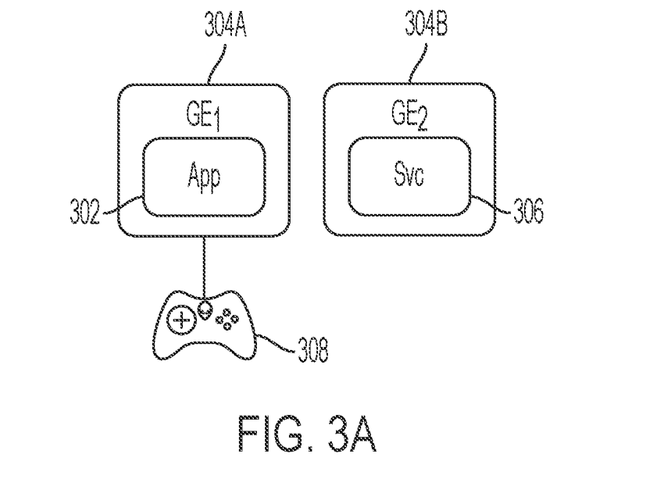
FIG. 3A is a block diagram illustrating application and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
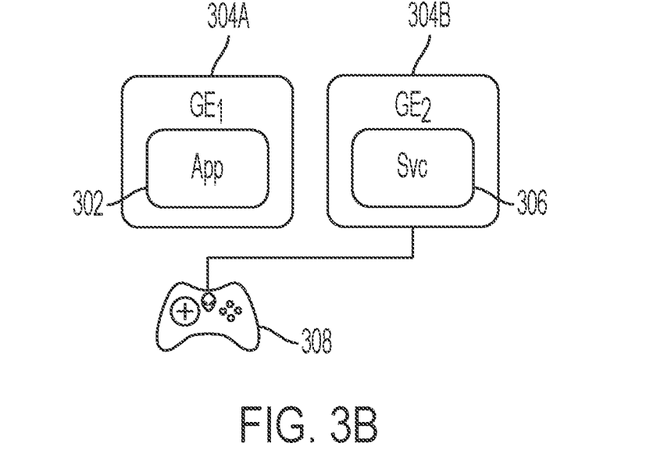
FIG. 3B is a block diagram illustrating application and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
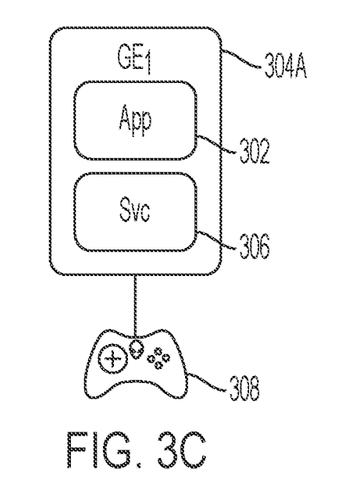
FIG. 3C is a block diagram illustrating application and service hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
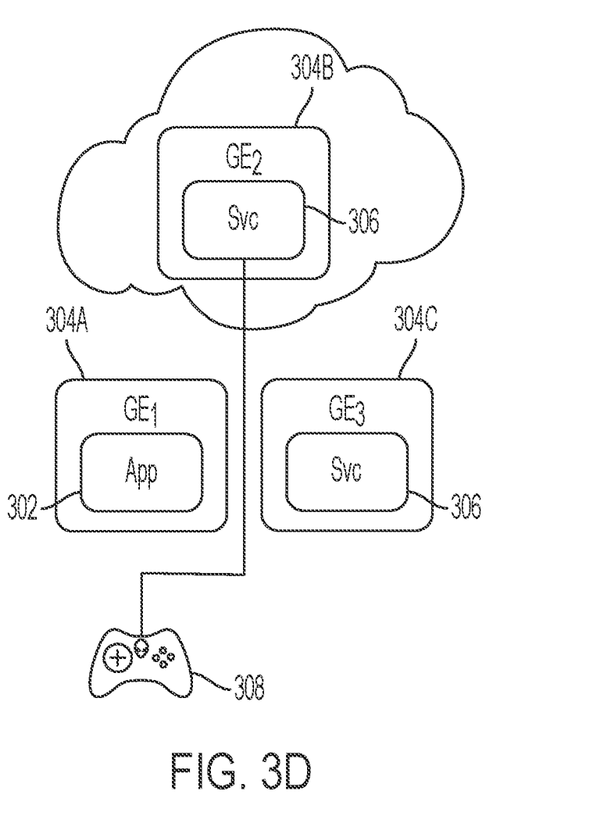
FIG. 3D is a block diagram illustrating a cloud-based service arrangement for a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, such as when the user's home includes the gaming environment 304B but the user is engaging with application 302 at a location on a different network from their home (e.g., at a friend's house). The service 306 may also or alternatively be executed, for example, on a cloud computing device available as a subscription service to the user.

An aggregate color palette may be customized for a user of an information handling system, such as a user using a gaming controller in the gaming environments 304. The color palette may be used, for example, to determine colors to project from various lighting devices embedded in the gaming controller, the AV equipment, and/or other lighting devices in the environment.

Figure 4:
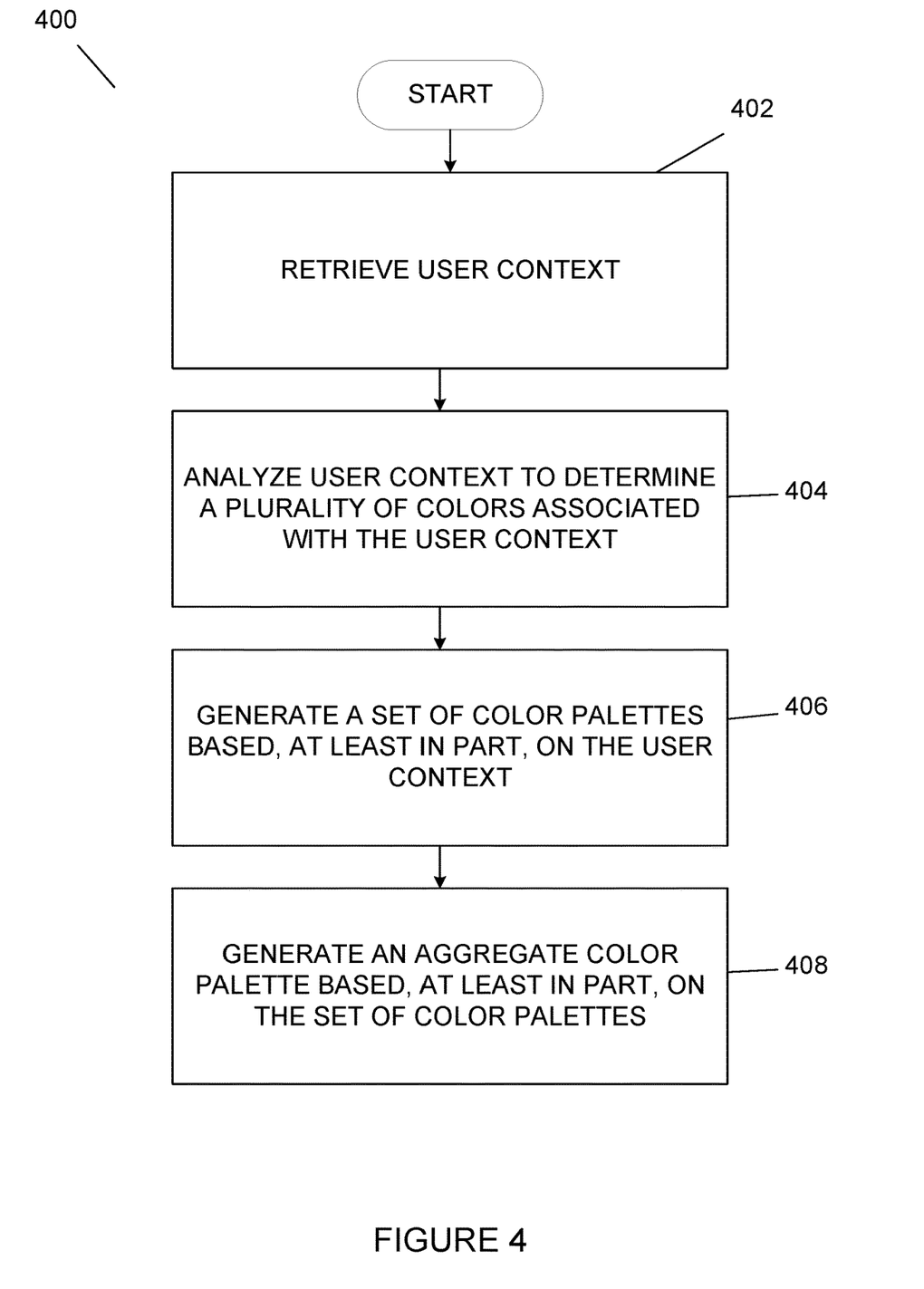
FIG. 4 is a flowchart diagram illustrating a method of generating an aggregate color palette using user context according to some embodiments of the disclosure.

FIG. 4 is a flowchart diagram illustrating a method of generating an aggregate color palette using user context according to some embodiments of the disclosure. Method 400 may be performed, for example, by an information handling system, such as a hub device. At block 402, the information handling system retrieves user context components from a plurality of sources. User context may be retrieved from, for example, a camera feed, a microphone, or external inputs such as information handling systems of the user's friend, in-game contacts, or other co-players in contact with the user. At block 404, the information handling system analyzes the user context to determine a plurality of colors associated with the user context. At block 406, the information handling system generates a set of color palettes based, at least in part, on the user context. The information handling system may utilize a machine learning algorithm to determine the set of color palettes with the user context as an input. The machine learning algorithm utilized by the information handling system may further generate an aggregate color palette based, at least in part, on the set of color palettes at block 408. The aggregate color palette may be generated based, at least in part, on user-determined weights for each of a plurality of components of the user context.

Figure 5:
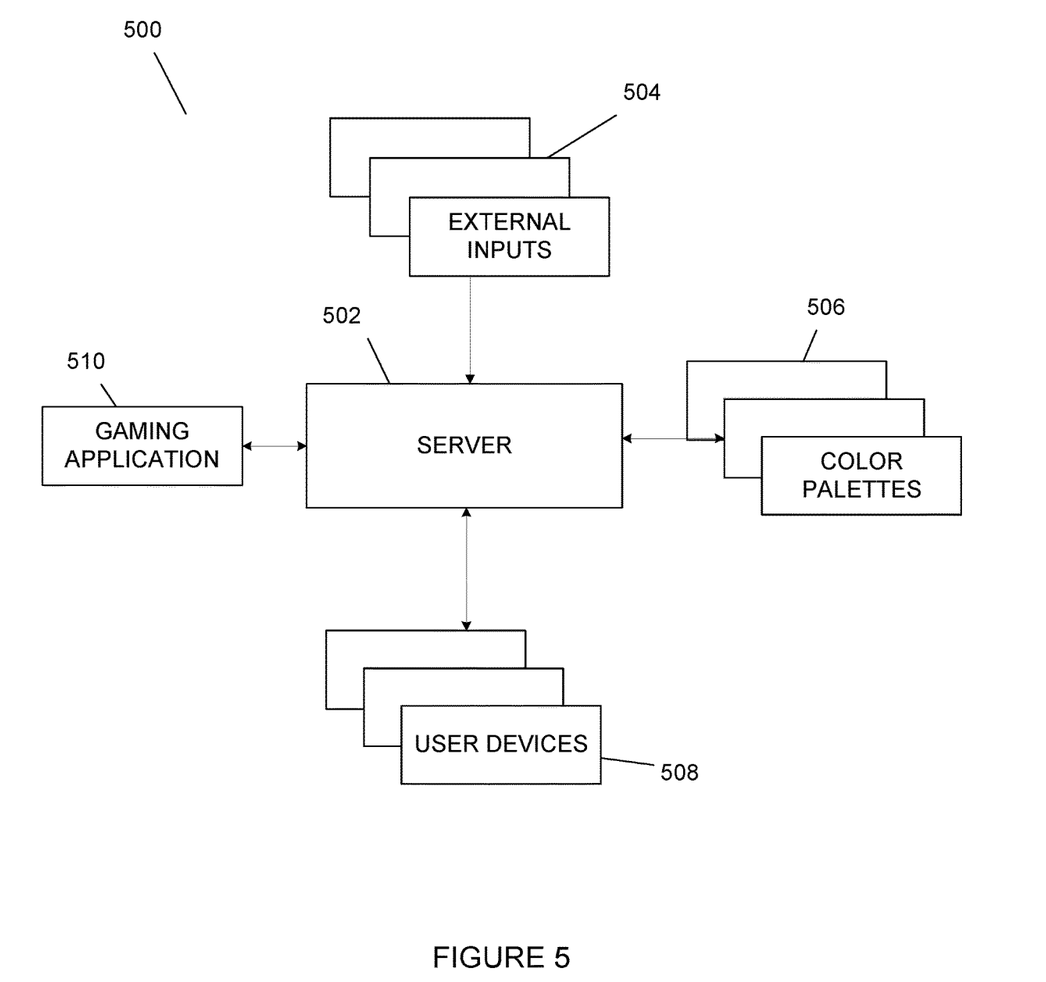
FIG. 5 is a block diagram illustrating a service arrangement with associated inputs according to some embodiments of the disclosure.

FIG. 5 is a block diagram illustrating a service arrangement with associated inputs according to some embodiments of the disclosure. Block diagram 500 illustrates the server 502 receiving external inputs 504 from a plurality of sources. The external inputs 504 may include, for example, input from information handling systems associated with one or more friends of the user, in-game contacts, or other co-players in contact with the user. The server 502 may retrieve one or more pre-existing color palettes associated with the one or more friends of the user as a component of the user context. The server 502 utilizes and may update pre-existing color palettes associated with the user. The server 502 communicates with user devices 508, which may retrieve input from the user's environment. User devices 508 may include, for example, a camera, microphone, or mobile device. The camera feed may be used as an input in an object segmentation step to separate the user from their environment. The information handling system may determine one or more colors associated with the user, such as clothing and accessories, and environment, such as color theme of the room or wall color, which may be used as user context components. The server 502 communicates with the gaming application 510 being executed by the information handling system. For example, one or more colors of a color palette may be determined based on game art or screenshots, game context, in-game notifications, or game history associated with the user, for example. Each of these associated inputs in communication with the server may influence a set of color palettes according to certain embodiments of the disclosure.

Figure 6:
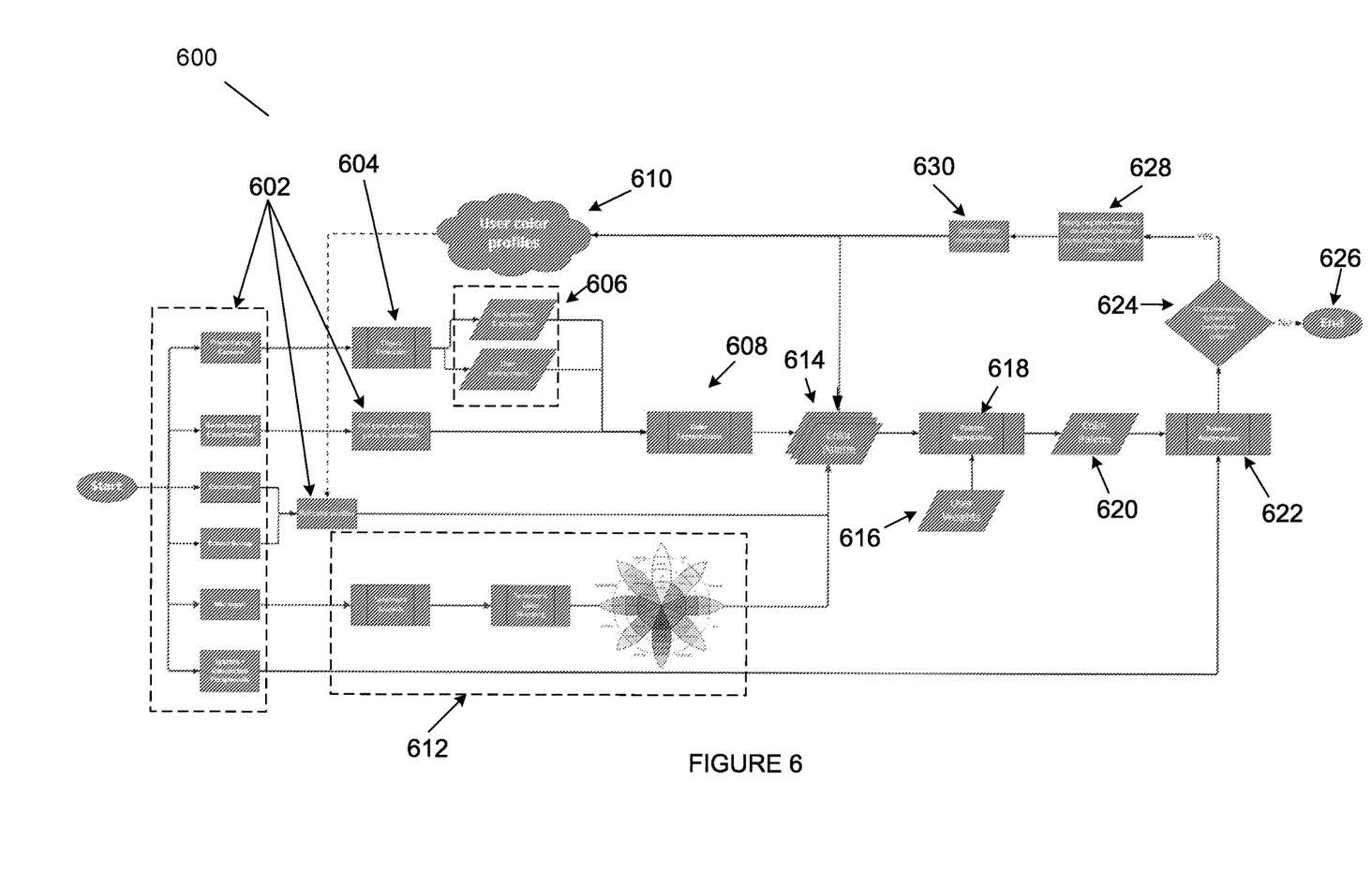
FIG. 6 is a flowchart diagram illustrating a method of utilizing user context components to determine an aggregate color palette according to some embodiments of the disclosure.

FIG. 6 is a flowchart diagram illustrating a method of utilizing user context components to determine an aggregate color palette according to some embodiments of the disclosure. Diagram 600 illustrates a more in-depth analysis of the use of some user context components according to certain embodiments. User context components 602 are used to generate a set of color palettes 614. User context components may include, for example: a front-facing camera feed; gaming application history associated with the user or context of a current gaming application being executing by the information handling system; pre-existing color profiles of a current user 610 or one or more friends or contacts of the user; audio input from a microphone; or other inputs from peripheral devices and systems. Input from the front-facing camera may be fed through an object segmentation algorithm 604 wherein objects may be detected. For example, the user may be separated from their environment to identify one or more colors associated with the user's clothing, accessories, wall color, or other color theme associated with the user's environment at block 606. The audio input may undergo sentiment analysis 612 to determine a mood or sentiment of the user. The information handling system may identify appropriate colors associated with the emotion or mood of the user based on, for example, a sentiment color map. Similarly, in-game text or chat with friends or other players may undergo sentiment analysis. The colors associated with the current game or game history may also under color segmentation 608 as part of the theme of the game or game context, such as a user's success or failure during gameplay.

These user context components are analyzed by the information handling system to determine a plurality of colors. The information handling system may generate a set of color palettes 614 based, at least in part, on the user context. The set of color palettes 614 are used as an input of a machine learning algorithm 618 to generate an aggregate color palette 620. The machine learning algorithm may use user-assigned weights 616 in order to generate the aggregate color palette 620. The aggregate color palette 620 may comprise four colors: a primary color; a secondary color; a tertiary color; and a quaternary color. Each color of the aggregate color palette 620 may be assigned 622 to a system or peripheral device connected to the information handling system through a wired or wireless connection. The colors may be assigned, for example, based on peripheral usage characteristics. For example, a peripheral device determined to be used most frequently by the user, such as a gaming controller, may be assigned the primary color, with each subsequent color assigned based on frequency of usage. The user may also identify which peripherals are desired based on the level of interaction, rather than ongoing usage. For example, while some speakers or headsets are capable of RGB lighting, the user may want to prioritize a keyboard, mouse, or gaming controller as the primary peripheral to be assigned the primary color. The speakers and headset are used throughout gameplay, but the user directly interacts with the gaming controller or keyboard and may want to overwrite the assignments to assign another color, such as the secondary or tertiary color, to the speakers or headset. Colors of the aggregate color palette may be applied to any peripheral system or device that utilizes RGB lighting and is connected to the user's information handling system through a wired or wireless connection such as, for example, room lighting, gaming chair, headphones, microphone, speakers, mousepad, lighting towers, color strips, information handling system casing, or various other components within the information handling system.

The user may choose to overwrite the system or peripheral device color assigned at block 624. If the user approves of the color assignment, the process ends at block 626. If the user chooses to make adjustments or changes, the system applies negative feedback on the peripheral and color combination for current user context at block 628. This negative feedback is used to update the color profile of the user 630 to be used as user context in future determinations by the machine learning algorithm. This may result in, for example, further training of the machine learning algorithm based on the user's negative (or positive) feedback. This method creates a more personalized experience for the user and allows the system to generate more relative color palettes that are desirable to the user.

Figure 7:
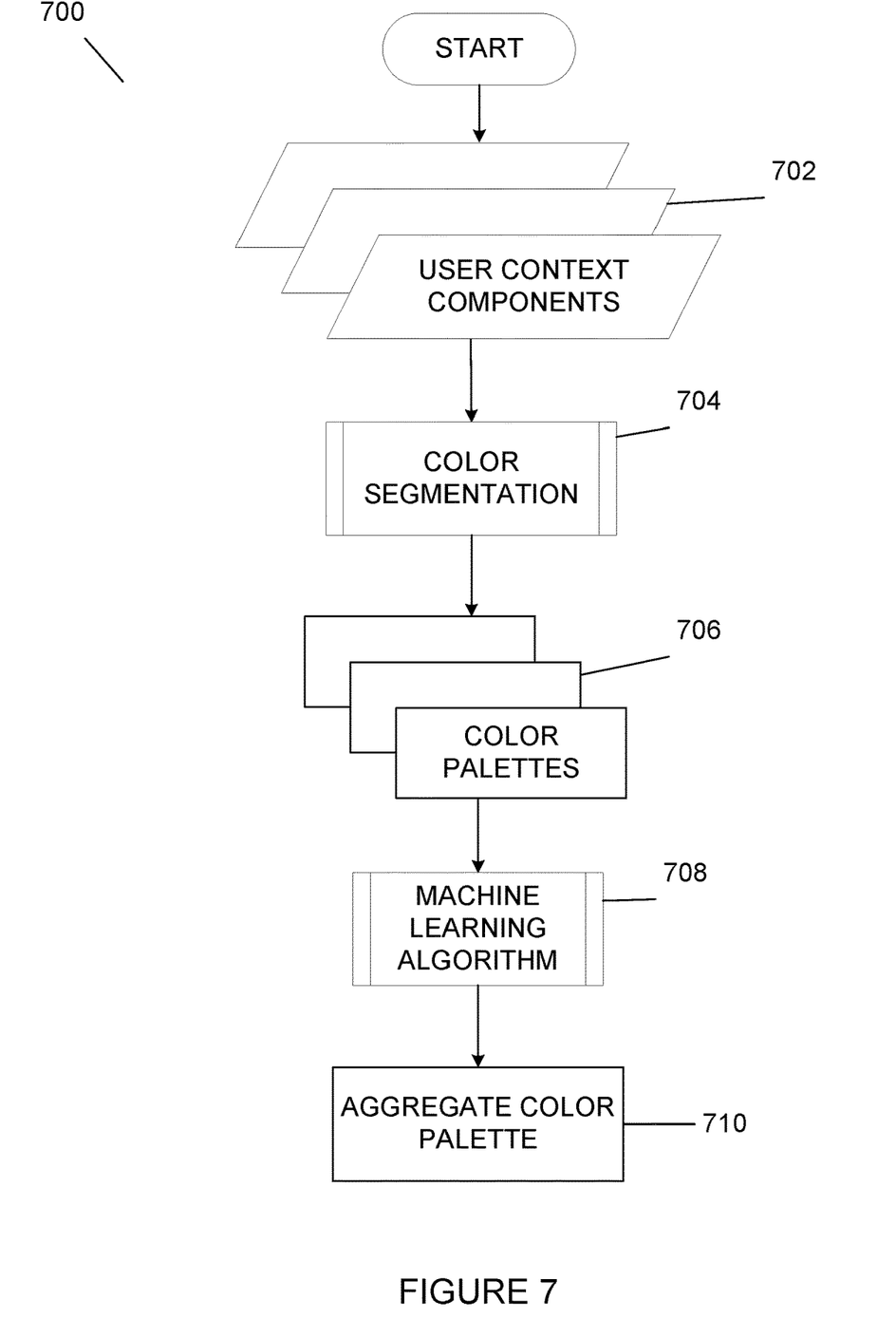
FIG. 7 is a block diagram illustrating a method of utilizing user context components to determine an aggregate color palette according to some embodiments of the disclosure.

FIG. 7 is a block diagram illustrating a method of utilizing user context components to determine an aggregate color palette according to some embodiments of the disclosure. Method 700 utilizes one or more user context components at block 702. The information handling system analyzes the user context to determine a plurality of colors associated with the user context, such as through color segmentation at block 704. Based on this analysis, the information handling system generates a set of color palettes at block 706 based, at least in part, on the user context. The set of color palettes are used as an input into a machine learning algorithm at block 708, which also takes into consideration user-assigned weights for each of a plurality of components of the user context. If the user does not apply weights to the user context components, the algorithm may be refined through user feedback toward the outputted aggregate color palette. The outputted aggregate color palette at block 710 may be applied to a plurality of peripheral systems or devices.

Figure 8:
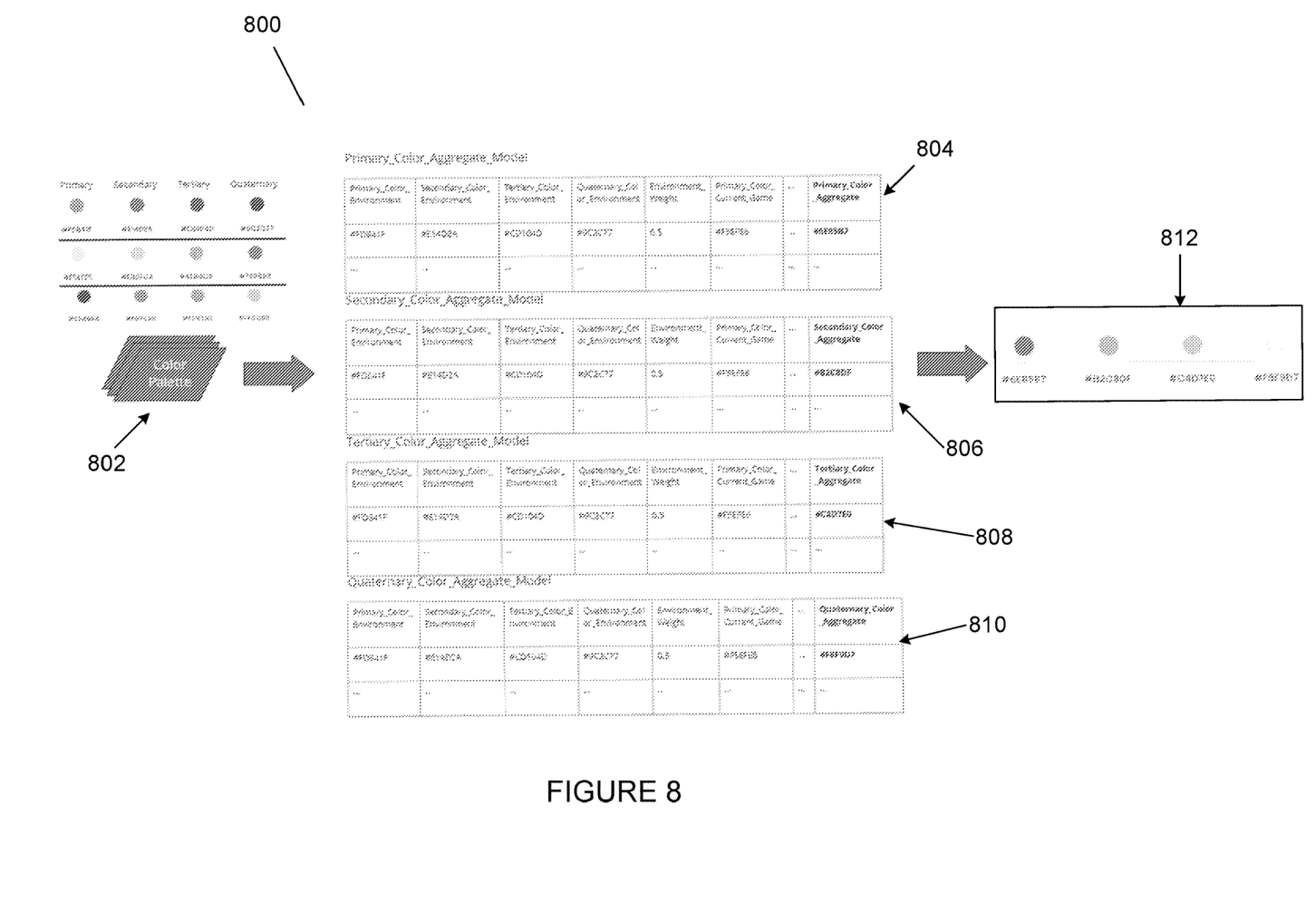
FIG. 8 is a block diagram illustrating weights associated with each of a plurality of user context components to generate an aggregate color palette according to some embodiments of the disclosure.

FIG. 8 is a block diagram illustrating weights associated with each of a plurality of user context components to generate an aggregate color palette according to some embodiments of the disclosure. Diagram 800 illustrates the weights of each user context component used to generate the set of color palettes 802. Each color palette may comprise four colors: a primary color; a secondary color; a tertiary color; and a quaternary color. A color palette may be generated for each user context component, each color palette comprising four colors. The machine learning algorithm considers each color of each set to determine an aggregate color palette 812. In one example, a color palette is associated with the user's environment. The user identified an environment weight to be 0.5, as illustrated in the embodiment of FIG. 8. In this embodiment, there is also a color palette associated with the current game, with the current game weight defined as, for example, 0.3. The primary color of the environment palette and the primary color of the current game palette are considered by the machine learning algorithm according to their user-defined weights, and an aggregate primary color 804 is determined. There are a plurality of color palettes, each associated with a user context component. The primary color from each color palette is weighed based on the weight associated with its user context component to output an aggregate primary color 804. The same method is applied for each of an aggregate second color 806, an aggregate tertiary color 808, and an aggregate quaternary color 810, resulting in an aggregate color palette 812.

Figure 9:
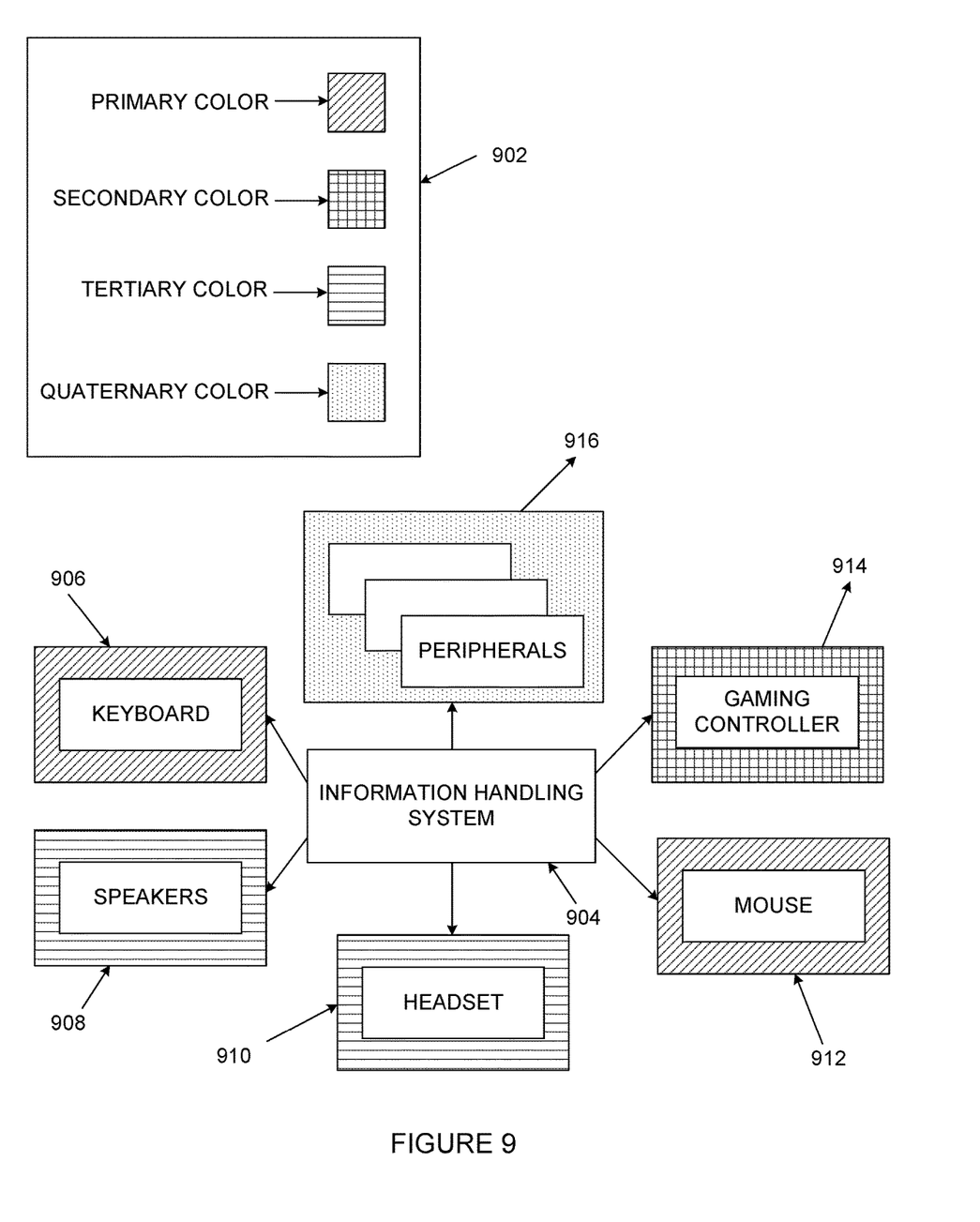
FIG. 9 is a block diagram illustrating the assignment of each color of the aggregate color palette to at least one of a plurality of peripherals connected to the information handling system according to some embodiments of the disclosure.

FIG. 9 is a block diagram illustrating the assignment of each color of the aggregate color palette to at least one of a plurality of peripherals connected to the information handling system according to some embodiments of the disclosure. Each color of the aggregate color palette 902 is assigned to a plurality of peripheral devices and systems connected to the information handling system 904 based on, for example, peripheral usage characteristics. Mouse 912 and keyboard 906 are assigned the primary color as the most frequently used peripherals. The gaming controller 914 may be assigned as the primary color by the information handling system. The user may provide negative feedback to the information handling system regarding either the color or the color/peripheral combination, and the user's color profile may be updated and the gaming controller 914 may be re-assigned the secondary color by the user or information handling system. The speakers 908 and headset 910 may be assigned the tertiary color. Various other peripherals 916, such as the microphone, may be assigned the quaternary color.

Figure 10:
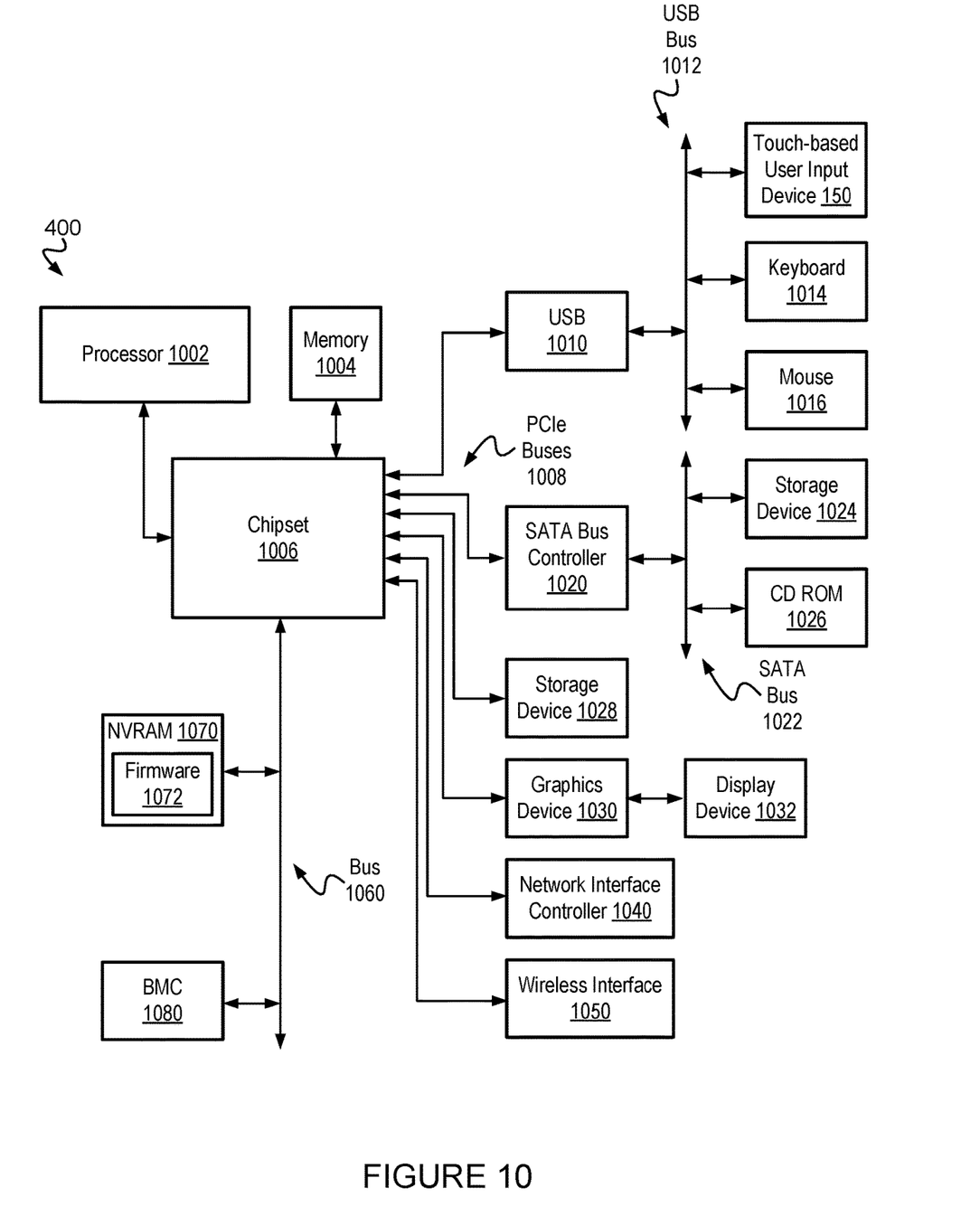
FIG. 10 is a schematic block diagram of an example information handling system according to some embodiments of the disclosure.

FIG. 10 illustrates an example information handling system 1000. Information handling system 1000 may include a processor 1002 (e.g., a central processing unit (CPU)), a memory (e.g., a dynamic random-access memory (DRAM)) 1004, and a chipset 1006. In some embodiments, one or more of the processor 1002, the memory 1004, and the chipset 1006 may be included on a motherboard (also referred to as a mainboard), which is a printed circuit board (PCB) with embedded conductors organized as transmission lines between the processor 1002, the memory 1004, the chipset 1006, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 1002, the memory 1004, the chipset 1006, and/or other components may be organized as a System on Chip (SoC).

The processor 1002 may execute program code by accessing instructions loaded into memory 1004 from a storage device, executing the instructions to operate on data also loaded into memory 1004 from a storage device, and generate output data that is stored back into memory 1004 or sent to another component. The processor 1002 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 1002 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 1006 may facilitate the transfer of data between the processor 1002, the memory 1004, and other components. In some embodiments, chipset 1006 may include two or more integrated circuits (ICs), such as a northbridge controller coupled to the processor 1002, the memory 1004, and a southbridge controller, with the southbridge controller coupled to the other components such as USB 1010, SATA 1020, and PCIe buses 1008. The chipset 1006 may couple to other components through one or more PCIe buses 1008.

Some components may be coupled to one bus line of the PCIe buses 1008, whereas some components may be coupled to more than one bus line of the PCIe buses 1008. One example component is a universal serial bus (USB) controller 1010, which interfaces the chipset 1006 to a USB bus 1012. A USB bus 1012 may couple input/output components such as a keyboard 1014 and a mouse 1016, but also other components such as USB flash drives, or another information handling system. Another example component is a SATA bus controller 1020, which couples the chipset 1006 to a SATA bus 1022. The SATA bus 1022 may facilitate efficient transfer of data between the chipset 1006 and components coupled to the chipset 1006 and a storage device 1024 (e.g., a hard disk drive (HDD) or solid-state disk drive (SDD)) and/or a compact disc read-only memory (CD-ROM) 1026. The PCIe bus 1008 may also couple the chipset 1006 directly to a storage device 1028 (e.g., a solid-state disk drive (SDD)). A further example of an example component is a graphics device 1030 (e.g., a graphics processing unit (GPU)) for generating output to a display device 1032, a network interface controller (NIC) 1040, and/or a wireless interface 1050 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 1006 may also be coupled to a serial peripheral interface (SPI) and/or Inter-Integrated Circuit (I2C) bus 1060, which couples the chipset 1006 to system management components. For example, a non-volatile random-access memory (NVRAM) 1070 for storing firmware 1072 may be coupled to the bus 1060. As another example, a controller, such as a baseboard management controller (BMC) 1080, may be coupled to the chipset 1006 through the bus 1060. BMC 1080 may be referred to as a service processor or embedded controller (EC). Capabilities and functions provided by BMC 1080 may vary considerably based on the type of information handling system. For example, the term baseboard management system may be used to describe an embedded processor included at a server, while an embedded controller may be found in a consumer-level device. As disclosed herein, BMC 1080 represents a processing device different from processor 1002, which provides various management functions for information handling system 1000. For example, an embedded controller may be responsible for power management, cooling management, and the like. An embedded controller included at a data storage system may be referred to as a storage enclosure processor or a chassis processor.

System 1000 may include additional processors that are configured to provide localized or specific control functions, such as a battery management controller. Bus 1060 can include one or more busses, including a Serial Peripheral Interface (SPI) bus, an Inter-Integrated Circuit (I2C) bus, a system management bus (SMBUS), a power management bus (PMBUS), or the like. BMC 1080 may be configured to provide out-of-band access to devices at information handling system 1000. Out-of-band access in the context of the bus 1060 may refer to operations performed prior to execution of firmware 1072 by processor 1002 to initialize operation of system 1000.

Firmware 1072 may include instructions executable by processor 102 to initialize and test the hardware components of system 1000. For example, the instructions may cause the processor 1002 to execute a power-on self-test (POST). The instructions may further cause the processor 1002 to load a boot loader or an operating system (OS) from a mass storage device. Firmware 1072 additionally may provide an abstraction layer for the hardware, such as a consistent way for application programs and operating systems to interact with the keyboard, display, and other input/output devices. When power is first applied to information handling system 1000, the system may begin a sequence of initialization procedures, such as a boot procedure or a secure boot procedure. During the initialization sequence, also referred to as a boot sequence, components of system 1000 may be configured and enabled for operation and device drivers may be installed. Device drivers may provide an interface through which other components of the system 1000 can communicate with a corresponding device. The firmware 1072 may include a basic input-output system (BIOS) and/or include a unified extensible firmware interface (UEFI). Firmware 1072 may also include one or more firmware modules of the information handling system. Additionally, configuration settings for the firmware 1072 and firmware of the information handling system 1000 may be stored in the NVRAM 1070. NVRAM 1070 may, for example, be a non-volatile firmware memory of the information handling system 1000 and may store a firmware memory map namespace 1000 of the information handling system. NVRAM 1070 may further store one or more container-specific firmware memory map namespaces for one or more containers concurrently executed by the information handling system.

Information handling system 1000 may include additional components and additional busses, not shown for clarity. For example, system 1000 may include multiple processor cores (either within processor 1002 or separately coupled to the chipset 1006 or through the PCIe buses 1008), audio devices (such as may be coupled to the chipset 1006 through one of the PCIe busses 1008), or the like. While a particular arrangement of bus technologies and interconnections is illustrated for the purpose of example, one of skill will appreciate that the techniques disclosed herein are applicable to other system architectures. System 1000 may include multiple processors and/or redundant bus controllers. In some embodiments, one or more components may be integrated together in an integrated circuit (IC), which is circuitry built on a common substrate. For example, portions of chipset 1006 can be integrated within processor 1002. Additional components of information handling system 1000 may include one or more storage devices that may store machine-executable code, one or more communications ports for communicating with external devices, and various input and output (I/O) devices, such as a keyboard, a mouse, and a video display.

In some embodiments, processor 1002 may include multiple processors, such as multiple processing cores for parallel processing by the information handling system 1000. For example, the information handling system 1000 may include a server comprising multiple processors for parallel processing. In some embodiments, the information handling system 1000 may support virtual machine (VM) operation, with multiple virtualized instances of one or more operating systems executed in parallel by the information handling system 1000. For example, resources, such as processors or processing cores of the information handling system may be assigned to multiple containerized instances of one or more operating systems of the information handling system 1000 executed in parallel. A container may, for example, be a virtual machine executed by the information handling system 1000 for execution of an instance of an operating system by the information handling system 1000. Thus, for example, multiple users may remotely connect to the information handling system 1000, such as in a cloud computing configuration, to utilize resources of the information handling system 1000, such as memory, processors, and other hardware, firmware, and software capabilities of the information handling system 1000. Parallel execution of multiple containers by the information handling system 1000 may allow the information handling system 1000 to execute tasks for multiple users in parallel secure virtual environments.

The schematic or flow chart diagrams of FIG. 4, FIG. 6, and FIG. 7 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   retrieving, by an information handling system via a gaming application executed by the information handling system, user context comprising a plurality of components comprising:
     user input for interacting with the gaming application; and
     gaming application history; and
   applying, by the information handling system, the user context as an input to a machine learning algorithm to generate:
     a set of color palettes based, at least in part, on the user context; and
     an aggregate color palette based, at least in part, on the set of color palettes.

2. The method of claim 1, wherein the plurality of components further comprises at least one of:
   camera feed;
   audio input;
   at least one pre-existing color palette; or
   friends of the user with at least one pre-existing color palette.

3. The method of claim 1, further comprising:
   receiving, from the user a weight for each of a plurality of components of the user context used to generate the aggregate color palette.

4. The method of claim 3, wherein the aggregate color palette comprises:
   a primary color;
   a secondary color;
   a tertiary color; and
   a quaternary color.

5. The method of claim 4, wherein a color of the aggregate color palette is assigned to at least one of a plurality of peripherals coupled to the information handling system based, at least in part, on peripheral usage characteristics.

6. The method of claim 1, further comprising receiving feedback from the user to update the machine learning algorithm.

7. An information handling system, comprising:
   a memory;
   a processor coupled to the memory, wherein the processor is configured to perform steps comprising:
   retrieving, by the information handling system via a gaming application executed by the information handling system, user context comprising a plurality of components comprising:
     user input for interacting with the gaming application; and
     gaming application history; and
   applying, by the information handling system, the user context as an input to a machine learning algorithm to generate:
     a set of color palettes based, at least in part, on the user context; and
     an aggregate color palette based, at least in part, on the set of color palettes.

8. The information handling system of claim 7, wherein the plurality of components further comprises at least one of:
   camera feed;
   audio input;
   at least one pre-existing color palette; or
   friends of the user with at least one pre-existing color palette.

9. The information handling system of claim 7, wherein the user determines a weight for each of a plurality of components of the user context used to generate the aggregate color palette.

10. The information handling system of claim 9, wherein the aggregate color palette comprises:
    a primary color;
    a secondary color;
    a tertiary color; and
    a quaternary color.

11. The information handling system of claim 10, wherein a color of the aggregate color palette is assigned to at least one of a plurality of peripherals coupled to the information handling system based, at least in part, on peripheral usage characteristics.

12. The information handling system of claim 7, further comprising receiving feedback from the user to update the machine learning algorithm.

13. A computer program product, comprising:
    a non-transitory computer readable medium comprising code for performing steps comprising:
    retrieving, by an information handling system via a gaming application executed by the information handling system, user context comprising a plurality of components comprising:
      user input for interacting with the gaming application; and
      gaming application history; and
    applying, by the information handling system, user context as an input to a machine learning algorithm to generate:
      a set of color palettes based, at least in part, on the user context; and
      an aggregate color palette based, at least in part, on the set of color palettes.

14. The computer program product of claim 13, wherein the plurality of components further comprises at least one of:
    camera feed;
    audio input;
    at least one pre-existing color palette; or
    friends of the user with at least one pre-existing color palette.

15. The computer program product of claim 13, wherein the user determines a weight for each of a plurality of components of the user context used to generate the aggregate color palette.

16. The computer program product of claim 15, wherein the aggregate color palette comprises:
    a primary color;
    a secondary color;
    a tertiary color; and
    a quaternary color.

17. The computer program product of claim 16, wherein a color of the aggregate color palette is assigned to at least one of a plurality of peripherals connected to the information handling system based, at least in part, on peripheral usage characteristics.

* * * * *